US012000729B2

(12) United States Patent
Han et al.

(10) Patent No.: US 12,000,729 B2
(45) Date of Patent: Jun. 4, 2024

(54) PERPENDICULAR DISTANCE PREDICTION OF VIBRATIONS BY DISTRIBUTED FIBER OPTIC SENSING

(71) Applicant: NEC Laboratories America, Inc., Princeton, NJ (US)

(72) Inventors: Shaobo Han, Princeton, NJ (US); Ming-Fang Huang, Princeton, NJ (US); Yuheng Chen, South Brunswick, NJ (US); Milad Salemi, Somerset, NJ (US)

(73) Assignee: NEC Corporation, Tokyo (JP)

( * ) Notice: Subject to any disclaimer, the term of this patent is extended or adjusted under 35 U.S.C. 154(b) by 172 days.

(21) Appl. No.: 17/555,990

(22) Filed: Dec. 20, 2021

(65) Prior Publication Data

US 2022/0196462 A1    Jun. 23, 2022

Related U.S. Application Data

(60) Provisional application No. 63/192,183, filed on May 24, 2021, provisional application No. 63/128,970, filed on Dec. 22, 2020.

(51) Int. Cl.
*G01H 9/00* (2006.01)
*G06N 7/01* (2023.01)
*G06V 10/28* (2022.01)
*G06V 10/44* (2022.01)

(52) U.S. Cl.
CPC ............. *G01H 9/004* (2013.01); *G06N 7/01* (2023.01); *G06V 10/28* (2022.01); *G06V 10/449* (2022.01); *G06T 2207/30181* (2013.01)

(58) Field of Classification Search
None
See application file for complete search history.

(56) References Cited

U.S. PATENT DOCUMENTS

2020/0200592 A1* 6/2020 Huang ................ H04B 10/071
2020/0209417 A1* 7/2020 Englund ............... G01V 1/226

FOREIGN PATENT DOCUMENTS

CN            109269452        *   1/2019

* cited by examiner

*Primary Examiner* — Brandi N Hopkins
*Assistant Examiner* — Nigel H Plumb
(74) *Attorney, Agent, or Firm* — Joseph Kolodka

(57) ABSTRACT

Distributed fiber optic sensing (DFOS) systems, methods and structures for determining the proximity of vibration sources located perpendicular to a sensor fiber that is part of the DFOS system that may potentially threaten/damage or otherwise compromise the sensor fiber itself. Systems, methods, and structures according to aspects of the present disclosure employ Artificial Intelligence (AI) methodology (ies) that use as input a fundamental physical understanding of wave propagation and attenuation in the ground along with Bayesian inference and Maximum Likelihood Estimation (MLE) techniques for estimating/determining the proximity of potentially damaging vibration sources to the optical sensor fiber.

2 Claims, 10 Drawing Sheets

| Ground Truth (m) | Estimate |
|---|---|
| 1 | 1 + 1.6 m |
| 2 | 2 + 2.3 m |
| 3 | 3 + 2.4 m |
| 4 | 4 + 0.3 m |
| 5 | 5 + 1.0 m |
| 6 | 6 + 0.2 m |
| 7 | 7 + 0.6 m |
| 8 | 8 + 0.7 m |
| 9 | 9 + 0.0 m |
| 10 | 10 + 1.6 m |
| 11 | 11 + 0.2 m |
| 12 | 12 + 1.0 m |

FIG. 3(A)

PERPENDICULAR DISTANCE PREDICTION OF VIBRATIONS BY DISTRIBUTED FIBER OPTIC SENSING

CROSS REFERENCE TO RELATED APPLICATIONS

This application claims the benefit of U.S. Provisional Patent Application Ser. No. 63/128,970 filed 22 Dec. 2020 and U.S. Provisional Patent Application Ser. No. 63/192,183 filed 24 May 2021 the entire contents of each of which is incorporated by reference as if set forth at length herein.

TECHNICAL FIELD

This disclosure relates generally to distributed fiber optic sensing (DFOS). More particularly, it pertains to a method for perpendicular distance prediction of vibrations by distributed fiber optic sensing.

BACKGROUND

As will be understood by those skilled in the art, DFOS systems including distributed acoustic sensing (DAS) and distributed vibration sensing (DVS) have found widespread use in monitoring a wide variety of environmental and infrastructure conditions. Given the contemporary importance of such DFOS systems, techniques that detect threats to the operation of a DFOS system itself would represent a welcome addition to the art.

SUMMARY

An advance in the art is made according to aspects of the present disclosure directed to a method for determining the proximity of vibration sources located perpendicular to a sensor fiber that is part of a DFOS system that may potentially threaten/damage or otherwise compromise the sensor fiber itself.

In sharp contrast to the prior art, systems, methods, and structures according to aspects of the present disclosure employ Artificial Intelligence (AI) methodology(ies) that use as input a fundamental physical understanding of wave propagation and attenuation in the ground along with Bayesian inference and Maximum Likelihood Estimation (MLE) techniques for estimating/determining the proximity of potentially damaging vibration sources to the optical sensor fiber.

BRIEF DESCRIPTION OF THE DRAWING

A more complete understanding of the present disclosure may be realized by reference to the accompanying drawing in which:

FIG. 3(A) and FIG. 3(B) show discrete perpendicular points from a fiber optic sensor cable and comparison of distance estimates as compared with a probability density map for the collected data according to aspects of the present disclosure;

Figure 1:
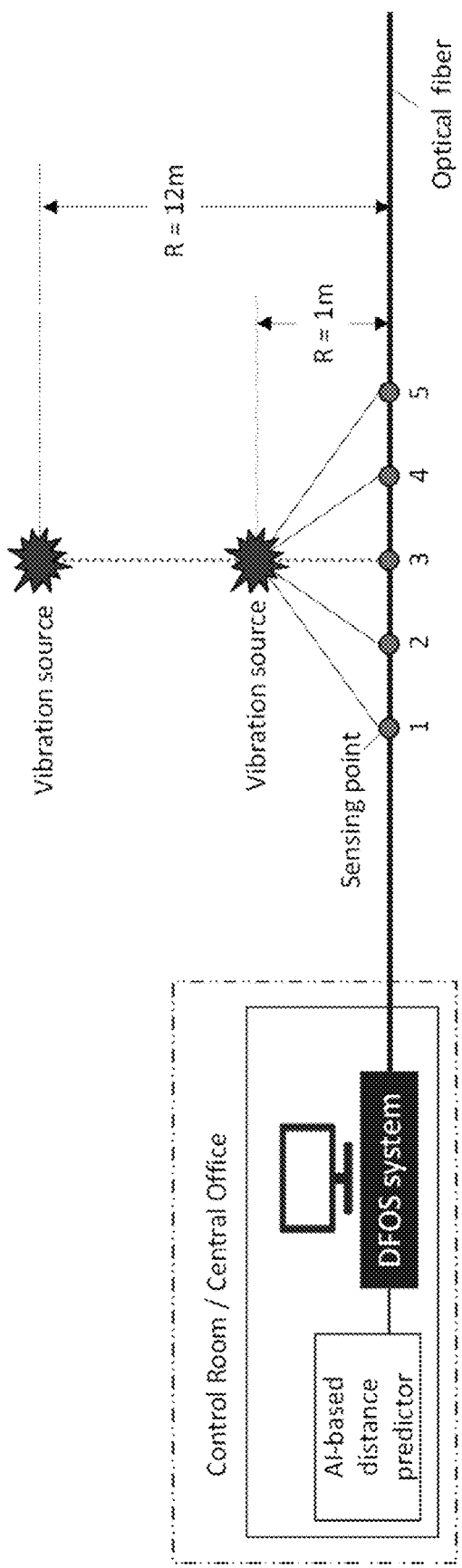
FIG. 1 is a schematic diagram of an illustrative DAS arrangement showing a positioning of a vibration source from a fiber optic sensor cable and perpendicular and diagonal distances according to aspects of the present disclosure.

The illustrative embodiments are described more fully by the Figures and detailed description. Embodiments according to this disclosure may, however, be embodied in various forms and are not limited to specific or illustrative embodiments described in the drawing and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background—we again note that in recent years, distributed fiber optic sensing (DFOS) systems including distributed vibration sensing (DVS) and distributed acoustic sensing (DAS) have found widespread acceptance in numerous applications including—but not limited to—infrastructure monitoring, intrusion detection, and earthquake detection. For DAS and DVS, backward Rayleigh scattering effects are used to detect changes in the fiber strain, while the fiber itself acts as the transmission medium for conveying the optical sensing signal back to an interrogator for subsequent analysis.

FIG. 1 shows a simplified schematic diagram of an illustrative DFOS/DVS/DAS system employing an interrogator/receiver/detection/analysis system. Operationally, such a system generates/applies an optical Tx signal into an optical sensing fiber which results in reflected/scattered optical signals being directed back to the receiver/analysis system which receives/detects/analyzes the reflected/scattered and subsequently received signals. The signals are analyzed, and an output is generated which is indicative of the environmental conditions including acoustic events, vibratory events, and/or temperature conditions encountered along the length of the fiber.

As we shall show and describe, aspects of the present disclosure disclose systems, methods, and structures that may be employed to detect threats of physical damage to buried optical fiber cables using Distributed Fiber Optic Sensing (DFOS) technologies and AI-based distance predictor model.

Those skilled in the art will understand and appreciate that protection of buried fiber optic cable infrastructure—including DFOS sensor cable—against possible damages due to authorized or unauthorized construction by various machineries such as excavators, drills, etc. is a major concern of stakeholders of such infrastructure to protect these assets and maintain a continuity of service to any customers. As will be appreciated, our technology disclosed herein advantageously provides an intelligent early warning system that generates alarms to possible and/or imminent damage or threats to fiber optic cable by detecting and estimating the location and distance of a potential threat source from the optical fiber.

We note that there have been numerous, prior art efforts using geophones and accelerometers to localize sources of vibration in the environment. More recently, such efforts have been extended to estimate perpendicular distances based on time of arrival of propagation waves and a Random Forrest classification methodology has been introduced. As those skilled in the art will know and understand, distance measuring methods that depend on a time of arrival of propagated waves are highly reliant on a frequency component analysis of vibration source and particularly difficult to detect and track wave peaks as scale of distances are oftentimes too short for the speed that waves travel in the ground. This will make such methods prone to error as the time difference between arrivals of ground waves is very small.

With reference now to FIG. 1, we note that machinery or device that alter the state of the ground such as excavators, jackhammers, drills, compactors, etc. will produce ground waves that may generally include Body (P), Shear (S), and Raleigh (R) waves. These waves are understood to travel/expand from their source as front substantially exhibiting a half-sphere shape. The amplitude(s) of these waves are attenuated due to radiation and material damping as they reach a sensor fiber—depending on the distance they travel from source to sensor fiber.

A more recently discussed approach in the literature involves finding parameters for governing equations of such attenuation to model wave propagation in various ground conditions, i.e. analytical solutions. Unfortunately, the complexity and heterogeneity of ground makes calibrating such models computationally costly and therefore practically prohibitive in real world scenarios. Notwithstanding such difficulty, a primary operationally thesis remains true namely, a combination of material effects and distance effects govern the attenuation of wave propagation in the ground in the vicinity of a buried optical fiber.

With this in mind, we note that these and other observable/determinable facts are used to develop models according to aspects of the present disclosure that advantageously do not need to know or learn the parameters that paralyze prior art analytical methods. As a result, systems, method, and structures according to aspects of the present disclosure provide an estimated perpendicular distance of a vibration source to a buried optical fiber.

With continued reference to FIG. 1, there is shown an illustrative system setup and test schematics for an illustrative DFOS system. The optical sensing system (DFOS) and AI-based distance predictor is shown as illustratively resident in a control office/central office which advantageously provides remote monitoring of an entire fiber optic sensor cable route.

Depending on their distance from a vibration source, sensing points located along the length of the optical fiber will experience different amplitudes of vibration waves. Generally, points along the optical fiber located the shortest distance between the vibration source and the optical sensing fiber (perpendicular distance—point 3 in FIG. 1) will generally experience a vibration wave exhibiting the highest amplitude as compared to points farther from the source along the optical fiber sensor cable (diagonal distance—points 1, 2, 4, and 5 in FIG. 1). At some point located at a greater distance, the vibrations are completely dissipated and go undetected at those greater distance points.

For our purposes however, this fact that each vibration instance from a potential vibration source produces multiple simultaneous sensor feedback(s) (sensed vibrations) allows for the generation of a vibration intensity profile for that distance.

When enough of such sensory detections are made a Bayesian inference model can be established through a joint probability distribution function or joint probability density function that maps the vibration source to the vibration intensity. Data may be collected at various perpendicular distance from the fiber optic sensor cable at constant intervals.

As shown illustratively in FIG. 1, a vibration source is located at distances from 1 m to a buried fiber optic sensor cable to 12 m from that fiber optic cable. The distance between sensing points on the optical fiber sensor is known since it is established by a desired spatial resolution on the DFOS system employed—which according to aspects of the present disclosure may advantageously be a Distributed Acoustic Sensor (DAS) or Distributed Vibration Sensor (DVS) system.

To develop such a map we collect a set of training dataset to establish the canonical joint probability distribution of distances from the optical fiber sensor cable and observed intensity. As test data is collected at discrete intervals the product is a joint probability distribution. We note that Kernel Density or Gaussian Process Regression (GPR) methods used as a contentious overlay was successfully implemented to establish joint probability density functions as well.

Figure 2:
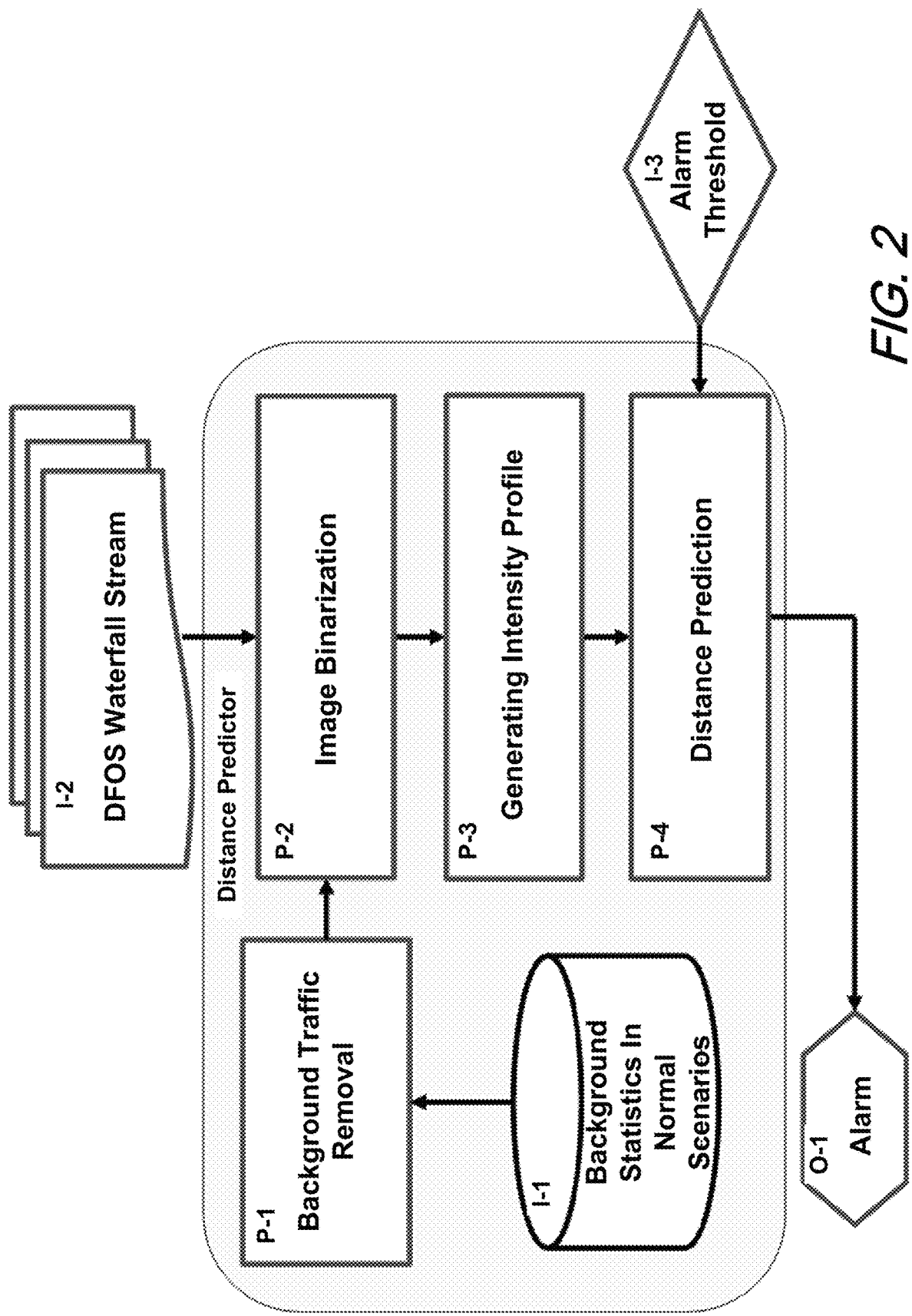
FIG. 2 is a flow diagram of illustrative DFOS system operation(s) according to aspects of the present disclosure.

Using such a map and the fact that at each perpendicular distance there are several diagonal distances that are more likely be formed at that particular perpendicular distance, a maximum likelihood for the perpendicular distance from optical fiber can be calculated. A flow diagram of the procedure is shown illustratively in FIG. 2.

With reference to that figure, we note that as used therein, "I" stands for inputs, "P" stands for procedures, and "O" stands for outputs. They are explained in detail below.

The system takes the following inputs.

I-1: Normal scenario statistics: After a certain period of field condition monitoring by the DFOS system, sensing signal intensity statistics are obtained as a system baseline which includes signals from—for example—road traffic in addition to background noise for the entire length of the fiber optic sensor cable route (without constructions).

I-2: DFOS waterfall stream: Comprises snapshots of waterfall data from DFOS sensor based on a sliding time window.

I-3: Alarm threshold: The Distance of the vibration source is calculated at cable points within each time window. A final alarm decision can be made by continuous monitoring the waterfall and estimating the distance across multiple time frames. An alarm will be triggered if the vibration source's perpendicular distance from the fiber optic sensor cable is shorter than the threshold (e.g. <5 m to the cable) and displayed on a map.

The system performs the following procedures.

P-1: Background traffic removal: Involves employing a patch-based median filter to remove background traffic.

P-2: Image Binarization: As an anomaly condition where construction is located, signals are normalized by computing its Z-score, the initial binary decision can be obtained.

P-3: Generating intensity profile: Generating dataset vibration intensity profile at each distance utilizing a discrete join probability map (Kernel Density and GPR).

P-4: Distance prediction: Bayesian inference is employed to determine the perpendicular vibration source distance based on combined effect of intensity at diagonal sensing points and perpendicular sensing point.

O-1: Display: Displays fiber optic sensor cable route information and detected distance to provide visualize results to carriers/operators. Based on the distance determination, an alarm may be generated prompting a technician to check/determine field activities.

The concept of the above developed model was successfully tested on both optical fiber that is buried for the purpose of research and development and in addition was tested on various optical fibers in service networks at various locations.

Figure 3B:
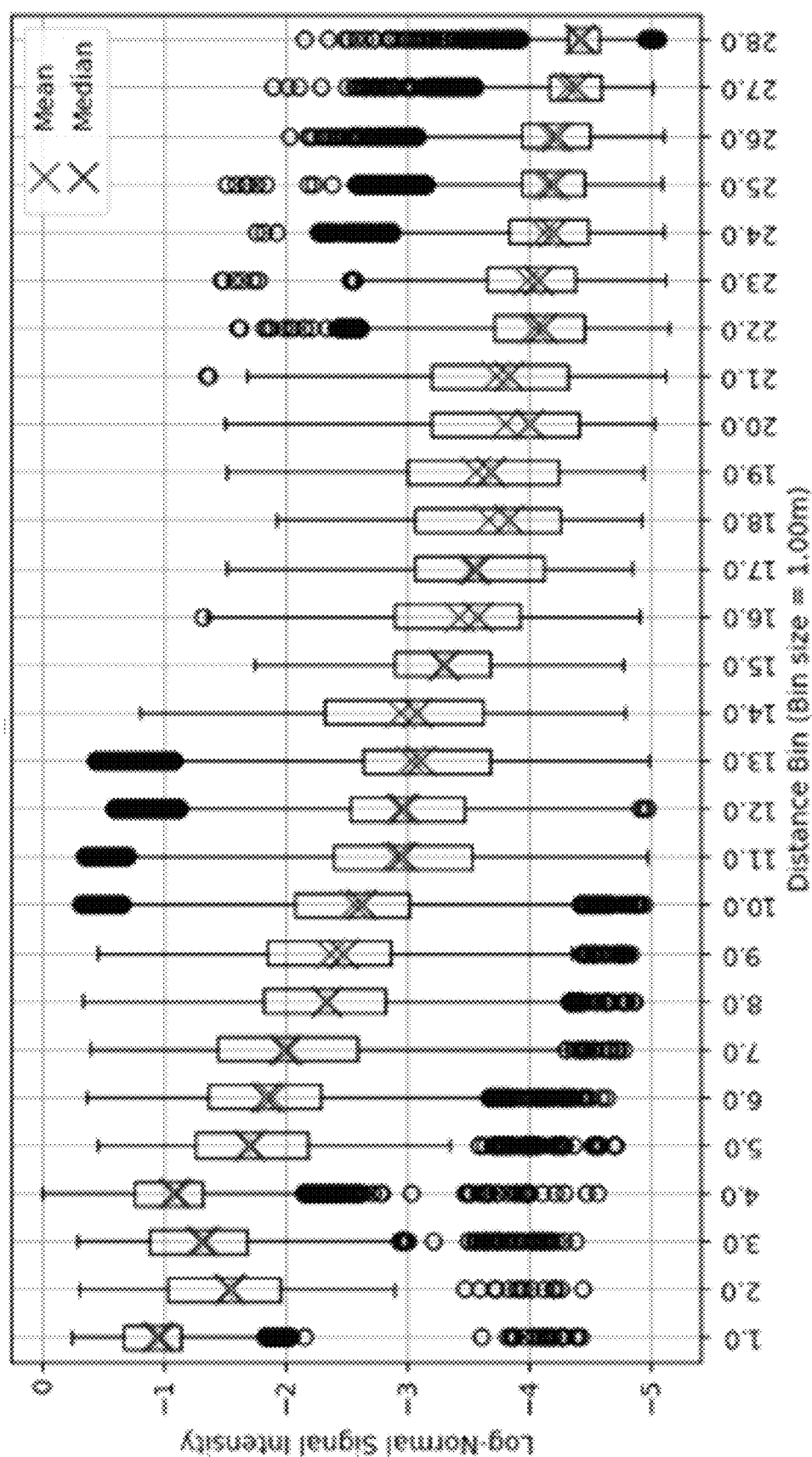

FIG. 3(A) and FIG. 3(B) show discrete perpendicular points from a fiber optic sensor cable and comparison of distance estimates as compared with a probability density map for the collected data according to aspects of the present disclosure.

Figure 4A:
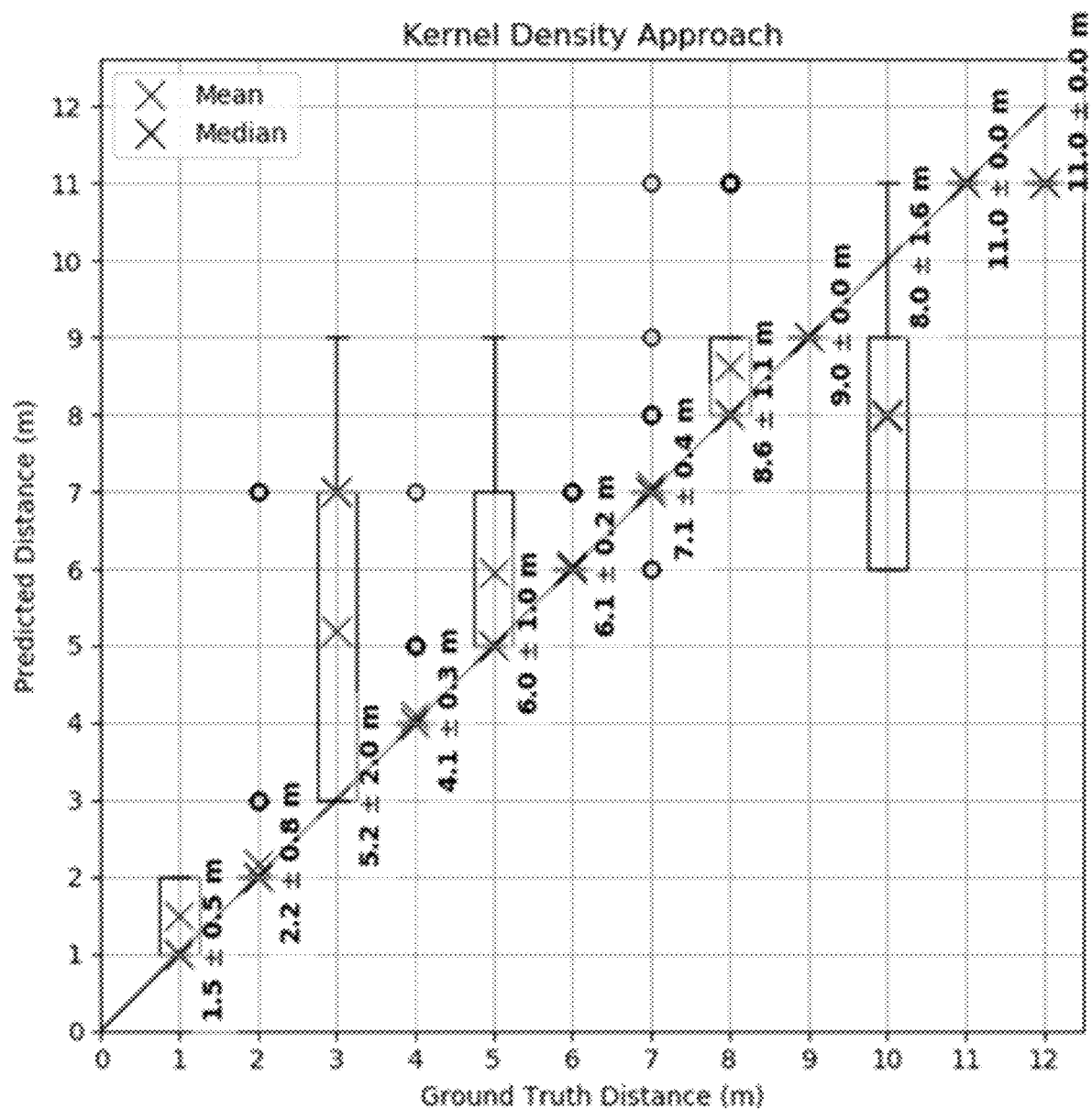
FIG. 4(A) and FIG. 4(B) are plots illustrating a continuous kernel density map and discrete Binning and distribution map according to aspects of the present disclosure.
Figure 4B:
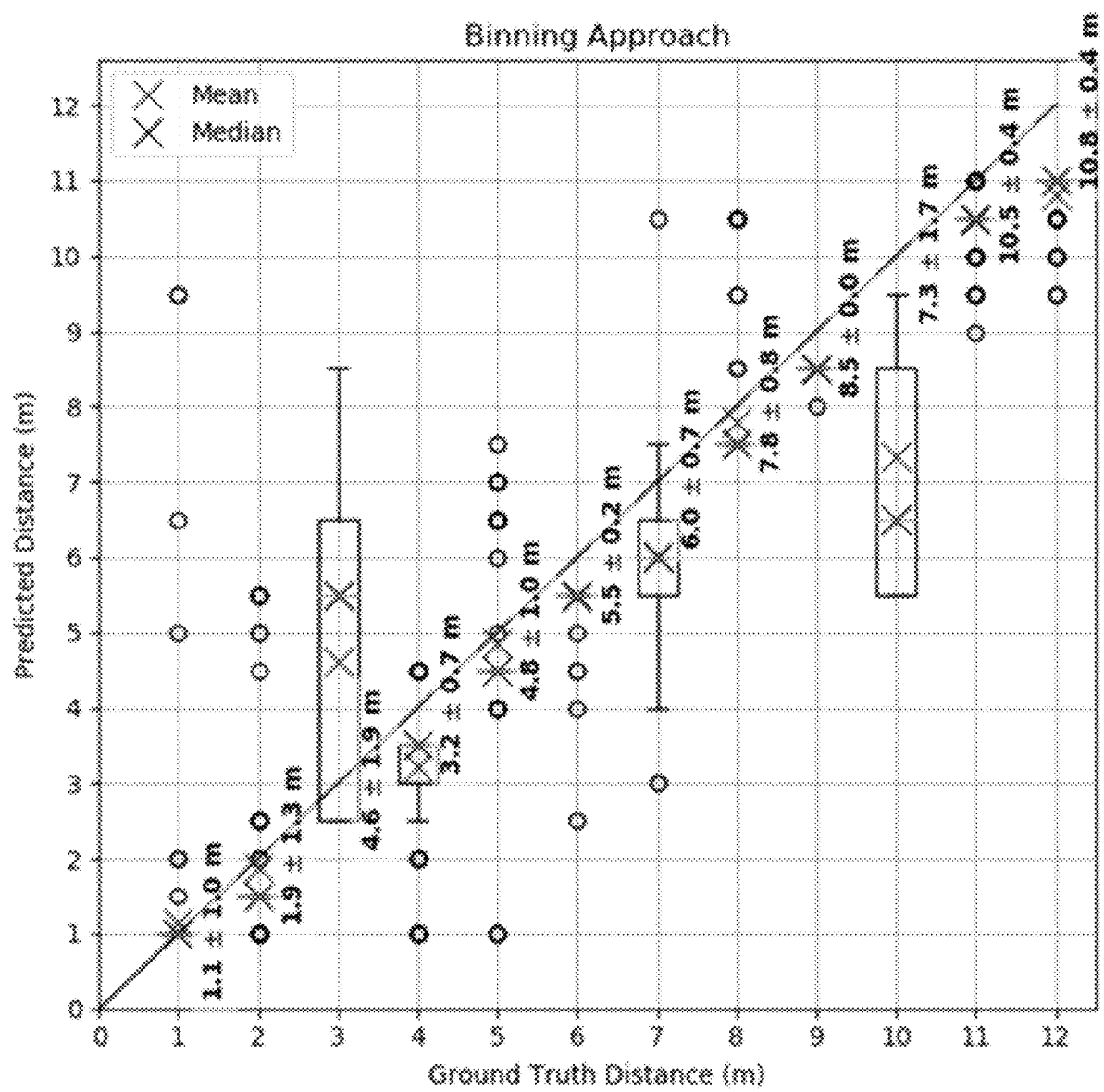

As may be observed from this figure, a joint probability established based on collected data at 12 perpendicular distances from the cable with the same vibration source and the estimates from the method shown in the table to the left is desirable given the fact that no parameter is known about wave propagation in grounds that test was performed. On a similar note, results of distance estimation based on same data and use of Kernel Density method to produce probability density as a continuous alternative is compared to the Binning approach as the direct probability distribution method and shown in FIG. 4(A) and FIG. 4(B) which are plots illustrating a continuous kernel density map and discrete Binning and distribution map according to aspects of the present disclosure.

Depending on the required accuracy continuous function approaches such as Kernel density can be implemented at more computational cost. But generally the discrete Binning approach effectively provides satisfactory results with less computational cost.

Figure 5A:
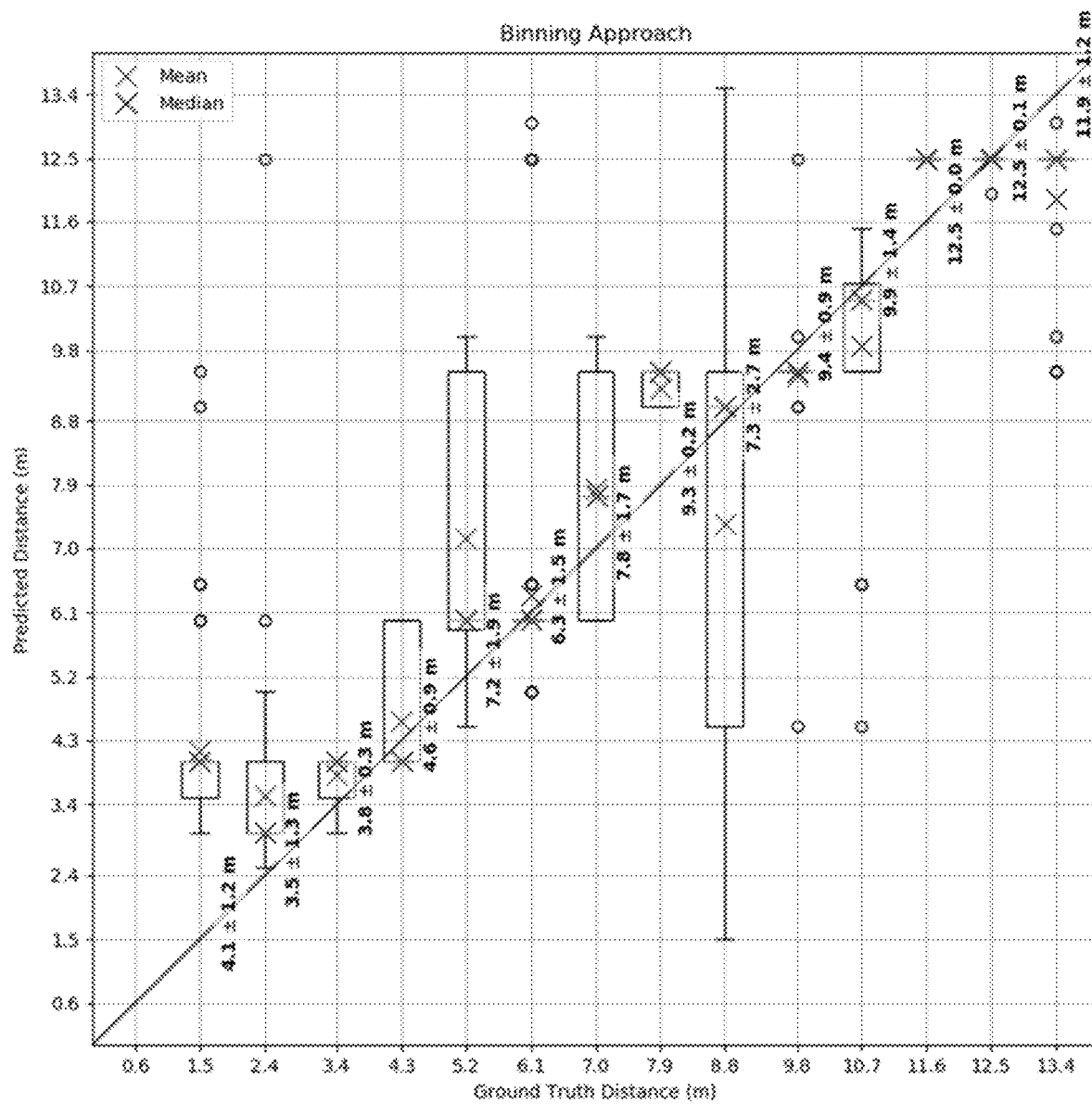
FIG. 5(A) and FIG. 5(B) show box plots of prediction results on test data according to aspects of the present disclosure.
Figure 5B:
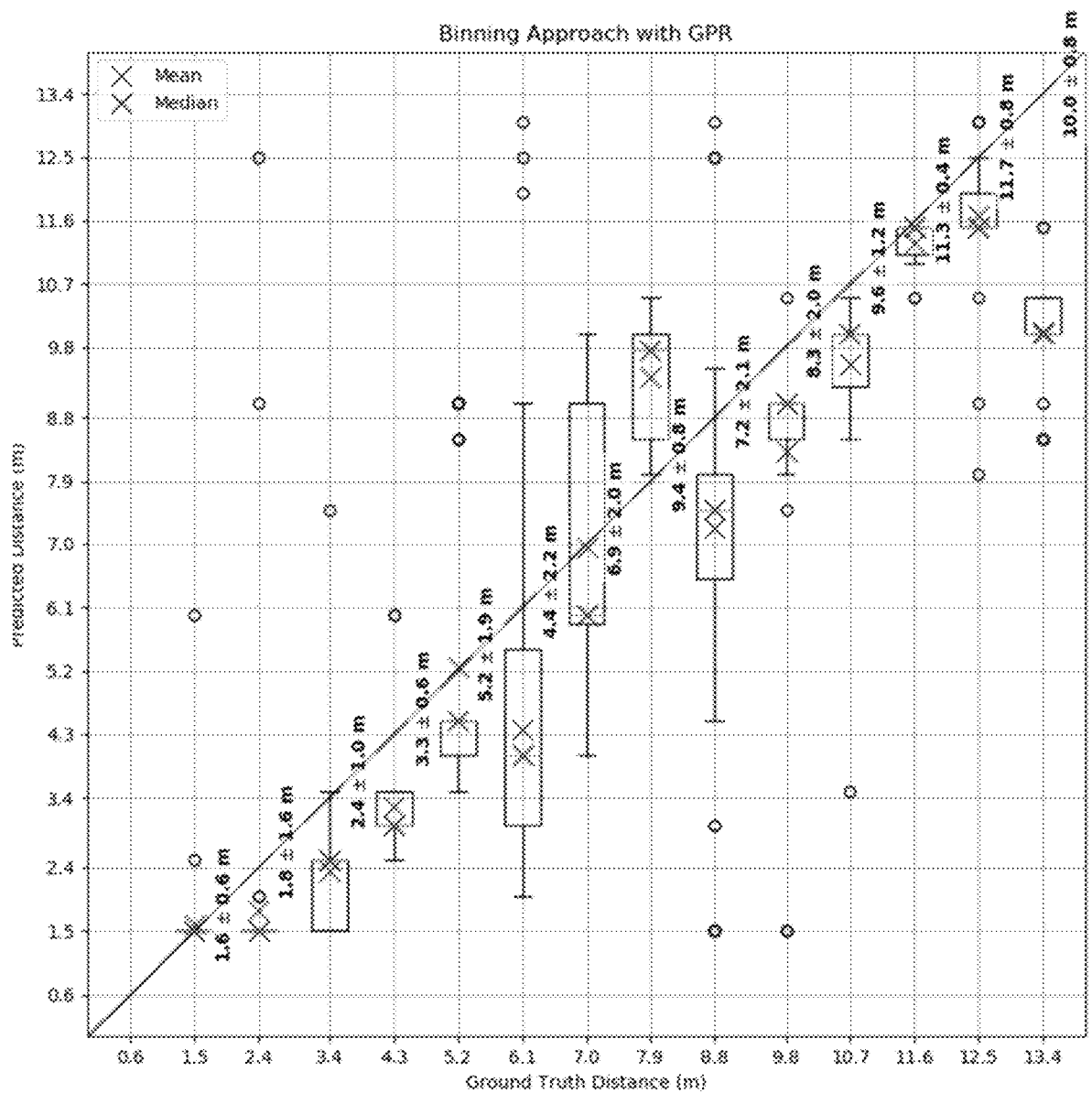

To further prove applicability of the developed model it was tested with in service optical fibers from in service cables which are buried at deeper depths and are generally subject to more uncertainty regarding the ground conditions. Here we also demonstrate vibration source distance estimation results of two approaches discrete Binning map and GPR enhanced continuous map in FIG. 5(A) and FIG. 5(B) which show box plots of prediction results on test data according to aspects of the present disclosure.

Figure 6:
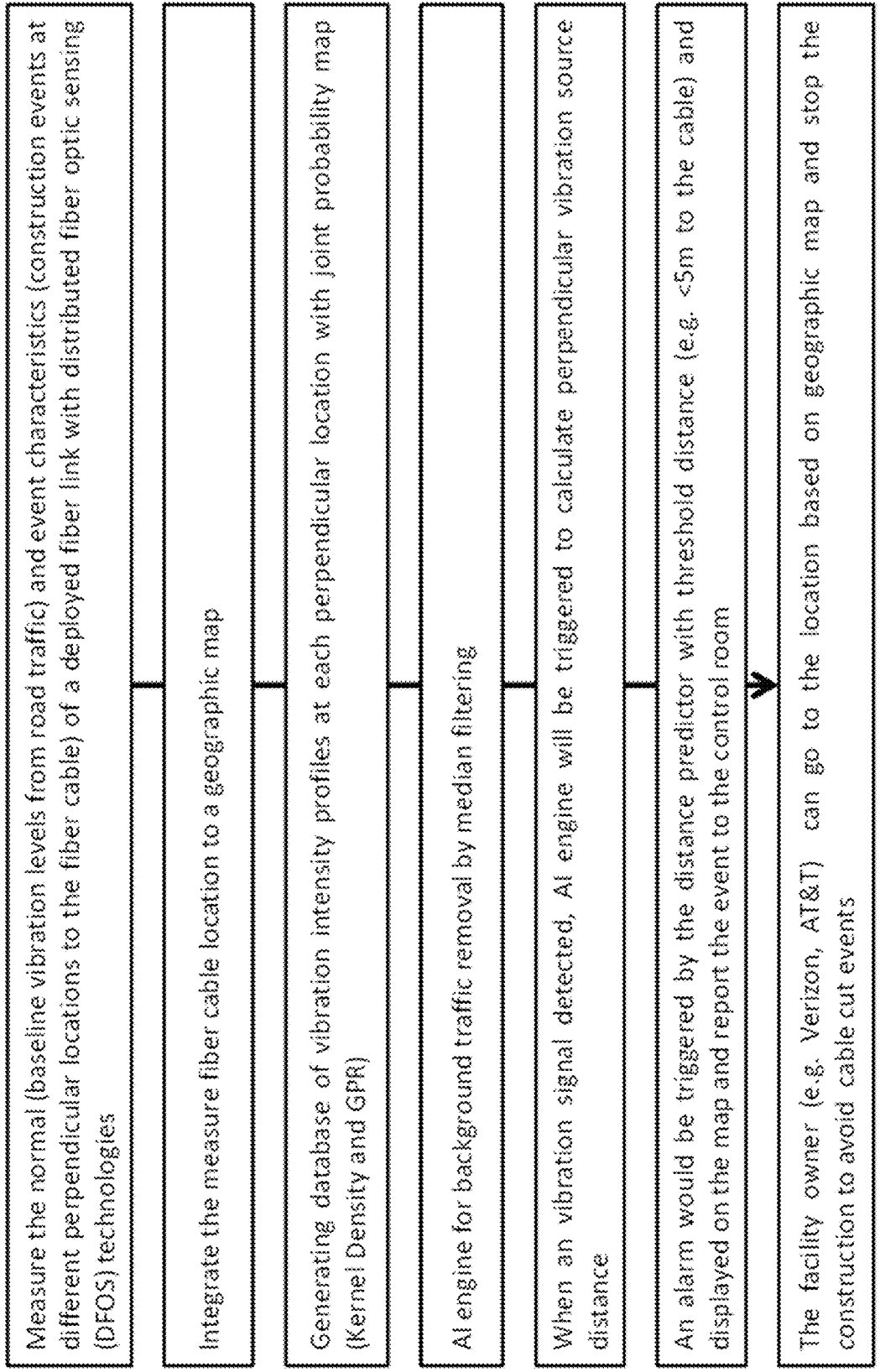
FIG. 6 is a flow diagram of an overall procedure according to aspects of the present disclosure.

FIG. 6 is a flow diagram of an overall procedure according to aspects of the present disclosure. With reference to that figure, it may be observed that our inventive method involves first, measuring and/or determining a normal, baseline vibration level from road or other traffic or events and event characteristics such as construction events at different perpendicular locations at distances from the fiber optic sensor cable of a deployed fiber link configured as a distributed fiber optic sensor (DFOS) system.

Second, the location(s) of the DFOS system fiber optic sensor cable is related to a geographic map.

Third, a database of vibration intensity profiles are generated for each perpendicular location using a joint probability map including a kernel density and gaussian progress regression.

Fourth, an AI engine is employed for determining background traffic by median filtering.

Fifth, when a vibration signal is detected through the effect of operation of the DFOS system, the AI engine is triggered to determine perpendicular vibration source distance from the fiber optic sensor cable.

Sixth, an alarm is triggered when the determined perpendicular vibration source distance from the fiber optic sensor cable is within a predetermined threshold distance (i.e., <=5 m) and displayed on a map reporting the alarm.

Finally, a facility owner/operator/maintenance operation is dispatched to the location based on the geographic map to avoid a fiber damage event due to the proximate vibration source.

At this point, those skilled in the art will further appreciate the utility of fiber optic sensing technologies for use locating underground fiber optic cables, identify threats to the cables—particularly threats developing perpendicular to the optical fiber, and thus improve the reliability of infrastructures. We can now report and describe for the first time the use of fiber optic sensing and machine learning technologies to continuously monitor environmental activities using an operational 5G transport network. Within a same fiber as operating 5G telecommunications traffic, our intelligent sensing systems process data in real-time and extract useful information for cable threat detection, localization and traffic sensing. The sensing field/area results provide a holistic view of the road traffic and environmental conditions over an entire route, which has the potential to discover seasonal variations in traffic congestion, vehicle counts and speed.

Operationally, fine-grained temporal resolution and low-latency enables transportation operators designing adaptive and precise traffic management strategies, such as dynamic routing to avoid congestion or reduce accidents. Additionally, various cable threat events in the field can be detected and localized, including fall-down incidents (pole, tree, or stone), road constructions, and distant vibrating sources. Reporting these events instantaneously can facilitate cable self-protection for sensing functionalities based on fiber sensing and further protect the facilities.

On-premise AI Assistant Multi-Continuous-Sensing Functions with a Single Fiber are made possible by detecting the change in intensity of Rayleigh scattering via interferometric phase beating in fiber, fiber optic sensing technology senses any vibrations near the fiber cable and generates large volume dataset. Processing data locally with edge AI reduces cost in both data transmission and storage and enhances data privacy. To achieve such continuous sensing, we describe our fiber-VTMS (Vehicle Traffic Monitoring System) and Fiber-CS3 (Cable Safety Self-Protection System), hosted on an on-premise AI platform with high benefit-cost ratio.

Figure 7:
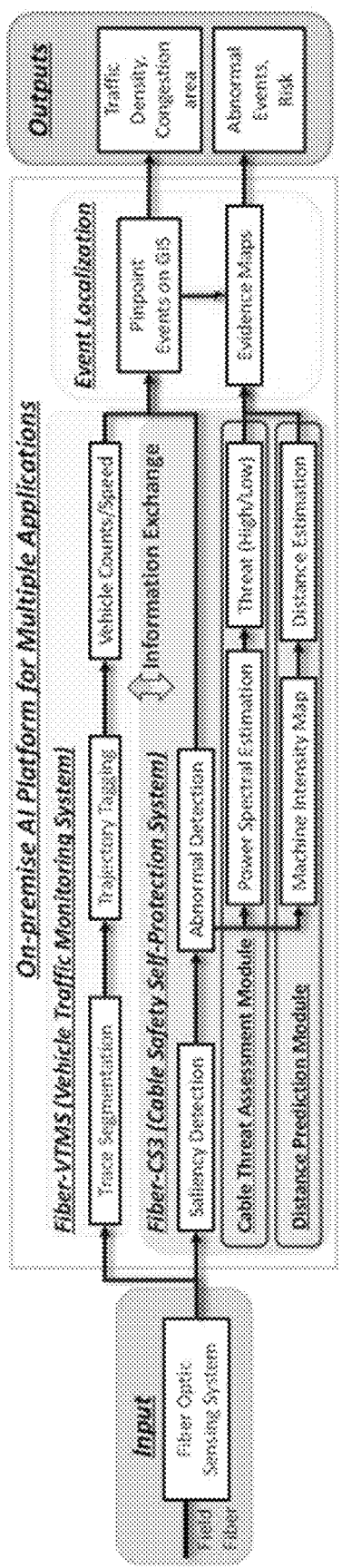
FIG. 7 is a schematic diagram illustrating architectural elements employed in a field trial DFOS system according to aspects of the present disclosure.

FIG. 7 is a schematic diagram illustrating such a many-in-one system connected to single field fiber. Information sharing between Fiber-VTMS and Fiber-CS3 allows us discovering complex correlated events and thus reducing false alarms. For example, road construction as the root cause of traffic jams, or responsible party for a cable damage event. The GPS coordinate of detected events can be pinpointed by a cable localization module.

Fiber-VTMS uses convolutional network architecture for precise segmentation of normal traffic patterns with high-frame rate and the vehicle counts and speeds are provided by a post-processing step. Fiber-CS3 solicits online information from Fiber-VTMS and utilizes it to establish a location-specific thresholds for abnormal detection over certain time window.

Strong vibrations points are first detected by a saliency detector, and those cannot be attributed to normal traffics in Fiber-VTMS are fed in Fiber-CS3. Accordingly, dense spatial-temporal sensing data is reduced to a sparse format, such that abnormal detection can be conducted on-the-fly with low latency. The threat level of the detected abnormal event is further assessed based on time-frequency representations. The location of the detected events along the cable can be pinpointed on the map accurately. High-level summary results are stored in the event log for future analysis.

We evaluated our inventive method and system at a field trial location in a carrier's 5G network in Long Beach Island (LBI), NJ, USA. The monitoring cable is 19 km and includes of aerial cables in the first 2 km and remaining 17-km underground cables (buried 40-60 inches depth) across the island. One distributed acoustic sensing (DAS) interrogator/analyzer/AI system is used in this trial and placed in a remote site to connect to the field fiber for real-time, continuous and long-term monitoring (>7 months).

From our field trial we were able to determine abnormal activities discovered (from both aerial and buried cables) and display same on an evidence map. In our previous trials, the cable threat-level is determined by frequency-attenuation mechanisms in the field experiments. Here, for the first time, the method was validated by in-field constructions. Abnormal scores indicate a high risk event, which may cut or otherwise damage the fiber optic sensor cable. As we determined—with fiber optic sensing technology—such events can be reported to a carrier immediately upon determination, and thus prevent/reduce the downtimes of the communication networks.

Using our collected data from the field trial, a pilot study that estimated source-to-cable distance was successfully conducted. Operationally, a vibrating apparatus was used to emulate machine engine noise from distances of 1.8 to 11 m to the cable separated by at least a 0.9 m interval. The active coverage was about 65.2 m along the cable. From the collected data, each sensing point along the cable (total of 41 points) was perpendicularly departed from the buried cable at the midpoint (point 21st). Intensities of the sensing points vary with a clear symmetry pattern, where the intensity at the midpoint is consistently higher and it is reduced proportionately in the further away sensing points (darker areas).

A probabilistic model based on the estimated joint probability distribution of distance and intensities was developed. The model exhibited a consistently high performance in predicting distances of vibration sources from fiber optic sensor cable. The mean and median indicators demonstrated high accuracy for predictions at most distances from cable.

As a result, we have successfully demonstrated coexisting cable safety self-protection, event localization and traffic monitoring applications using one DAS with a single standard fiber in operational 5G transport network. The continuous monitoring system operates in environments exhibiting variations caused by various environmental factors (e.g., weather and ground conditions) based on self-normalization. The on-premise AI platform ensures low-latency for timely actions to be taken. Fiber sensing provides a unique solution for cable safety self-protection without need of introducing other sensors, which is very useful in supporting other mission-critical 5G and beyond applications. The field trial results show that distributional fiber sensing with on-premise AI can create additional values for both carriers and third-party customers (such as transportation operators) with mutual benefits, which have great potential for future smart transportation, safer city, and smart city applications or monitoring in sparsely populated, rural areas in which optical fiber is deployed.

At this point, while we have presented this disclosure using some specific examples, those skilled in the art will recognize that our teachings are not so limited. Accordingly, this disclosure should be only limited by the scope of the claims attached hereto.

The invention claimed is:

1. A method of operating a distributed fiber optic sensing (DFOS)/distributed acoustic sensing (DAS) system to determine perpendicular distance(s) from a DAS sensing fiber to vibration sources said method comprising:
    operating the DAS system to measure baseline vibration levels and event characteristics at different perpendicular distances from locations along a length of sensing optical fiber that is part of the DAS system and collect a training dataset to establish canonical joint probability distribution of perpendicular distances from the sensing optical fiber and observed intensity;
    integrating the measured baseline vibration levels and respective perpendicular distances from locations along the length of the sensing optical fiber to a geographic map;
    generating a database of vibration intensity profiles for each perpendicular distance and location along the length of the sensing optical fiber;
    determining background traffic vibrations in the database of vibration intensity profiles and removing same according to a median filtering methodology;
    detecting a vibration through the effect of the DAS and determining a perpendicular distance from the sensing optical fiber of a source of the detected vibration; and
    wherein the perpendicular distance determination is made from a DFOS stream of waterfall plots resulting from operation of the DAS system;
    wherein the perpendicular distance determination includes an image binarization of the stream of waterfall plots; and
    wherein the perpendicular distance determination includes generating an intensity profile at each perpendicular location using a join probability map by a Kernel Density or Gaussian Process Regression (GPR) process.

2. The method of claim 1, further comprising generating and outputting an alarm when the determined perpendicular distance satisfies a pre-determined alarm threshold condition.

* * * * *